Sept. 8, 1953      J. J. GANO      2,651,746
CONTROL DEVICE

Filed Aug. 17, 1945      4 Sheets-Sheet 1

INVENTOR.
Joseph J. Gano

Sept. 8, 1953

J. J. GANO 2,651,746

CONTROL DEVICE

Filed Aug. 17, 1945

INVENTOR.
Joseph J. Gano

INVENTOR.
Joseph J. Gano

Patented Sept. 8, 1953

2,651,746

UNITED STATES PATENT OFFICE 2,651,746

CONTROL DEVICE

Joseph J. Gano, Worcester, Mass., assignor, by mesne assignments, to Kearney & Trecker Corporation, West Allis, Wis., a corporation of Wisconsin Application August 17, 1945, Serial No. 611,176

19 Claims. (Cl. 318—55)

This invention relates to control devices and has especial reference to automatic machine tool controls for governing the cutting or forming of desired shapes from metal or other material.

Present machine tools in which the cutting tool is caused to follow automatically a predetermined contour do not possess the ability to respond sufficiently rapidly to provide any degree of accuracy. If the system is made sensitive to respond to small deviations from the contour, overshooting results due to the inertia of the moving parts. If the system is made less sensitive, then the cutting tool has appreciable deviation from the contour before the response takes place. Either the oversensitive or undersensitive system results in an appreciable inaccuracy. Systems which utilize a step record operate on a principle which possesses limitations in speed and accuracy. If the record is run through rapidly, violent oscillations occur and, due to the rapidity of motion, a step in the movement of the tool may be skipped. These skips, which are errors, accumulate, resulting in a spoiled workpiece.

The present control system will permit extremely rapid cutting of the work without the usual concomitant troubles of lagging and overshooting. The cutting tool has a precise position as dictated by the record which may be a film, tape, or other element. It provides a continuous operation of the tool without any accumulation of errors. Thus, not only an accurate but a smooth cut is attained. The present invention also permits a means for an easy storage of records which are permanent.

In my copending application, Serial No. 581,059, filed March 5, 1945, now abandoned, it was shown how the position of a self synchronous or selsyn motor could be controlled by the application of related voltages upon the three geometrically equally spaced windings of the motor. The relation that these voltages must bear to each other is as follows:

Stator winding I: $\cos \phi + \frac{\sin \phi}{\sqrt{3}}$

Stator winding II: $-\frac{2}{\sqrt{3}} \sin \phi$

Stator winding III: $-\cos \phi + \frac{\sin \phi}{\sqrt{3}}$ where $\phi$ is the electrical angle of rotation of the shaft of the motor. In the case of a two pole motor, the electrical angle is equal to the geometrical or mechanical angle. In the present invention, the relations $\sin \phi$ and $\cos \phi$ are obtained from a record and are eventually combined by means of transformers to produce the above relations. The record has impressed upon it the signal which is determined by the contour it is desired to follow. Each motor that is to be controlled has two records associated with it although they may be placed on one film or tape. Each of the records has a sinusoidal signal, but one of them has its signal leading the signal of the other record by 90 degrees with respect to time. Thus, the signal which is leading bears a sine-cosine relationship with the other signal. The signals on the records are picked up by electronic heads and are sent through electronic amplifiers. The outputs from the amplifiers are then used as plate supply voltages on preferably Class C amplifiers. On the grids of the Class C amplifier tubes, an alternating current is inserted. Thus, the outputs from these amplifiers are voltages whose wave shapes have a carrier frequency equal to that of the voltage impressed upon the grids and whose envelopes are modulated by the sine and cosine relations impressed upon the record. By the proper combination of these output voltages, the position of the selsyn motor is controlled.

If two motors are to be controlled, an additional pair of records are necessary. These other two records again have signals impressed so as to be related to each other as the sine and cosine. The relation of the signals on one pair of records to that on the other pair is determined by the contour it is desired to follow.

The record frequency of the signal on the tape or film determines the speed of the controlled motor. Each cycle of sine wave represents one electrical revolution of the shaft of the motor. In a two pole motor, each sine wave cycle would represent one full revolution of the shaft of the motor. Thus, by impressing signals on each of the pairs of records so as to produce any desired relations in the respective speeds of the motors, the cutting tool may be caused to follow any contour. If a 45 degree angle is desired, then the frequency of the signals on the records are the same. If one motor is to rotate at twice the speed of the other, the signals on the records for the first motor will have twice the frequency of the signals for the records of the second motor.

The signals on the tape or film serve to establish gradually varying envelopes defining the amplitudes of power line frequency alternating currents in the sine-cosine motor control circuits, and to correlate the two motor control circuits for relative positioning of the two motors. Obviously the record frequency of the signal, as determined by the tapes or film speed, refers to the frequency of the envelope defining amplitude for alternating current of power supply frequency.

Together with the above described objects, it is an object to provide a machine tool control in which a record, such as a film or tape, is employed to control the device.

Another object is to provide a machine tool control with photoelectric control means.

A further object is to provide a machine tool control using a plurality of motors with a pair of tapes to control each motor.

One object is to provide an open loop machine tool control system operatively disposed to smoothly position the workpiece with respect to the cutting tool without discontinuity of motion or step action.

An additional object is to provide novel circuits for controlling a machine tool or other device.

Additional objects will appear in the following description.

Automatically guided machine tools fall into two classes, namely: machine tools of the generating class which generate workpiece configurations according to stored intelligence having no geometric properties similar to the workpiece; and machine tools of the regenerating or duplicator class commonly called copy machines.

The first named generating class of machine tools employs control means characterized as open loop control. Open loop control systems are defined as those control systems which do not have any provision for, nor do they answer back to the control medium. The second named duplicating class of machine tools employs control means characterized as closed loop control. Closed loop control systems are defined as those control systems which do have provision for and which do answer back to the control medium. This class of machines requires a controlled medium such as a pattern with configuration properties similar to those sought after in the workpiece. The "answer back" aforementioned refers to a control motion from the control produced which by virtue of this motion satisfies the pattern requirement.

It should be noted that the subject machine tool falls in the generating class and that its control system falls in the open loop class. Further attention is directed to the distinction that the intelligence record employed with this machine tool and control system is continuous and gradually varying as contrasted with the intelligence records of the punch tape type which is not capable of establishing an infinite number of relationships between the tool and workpiece.

Figure 1:
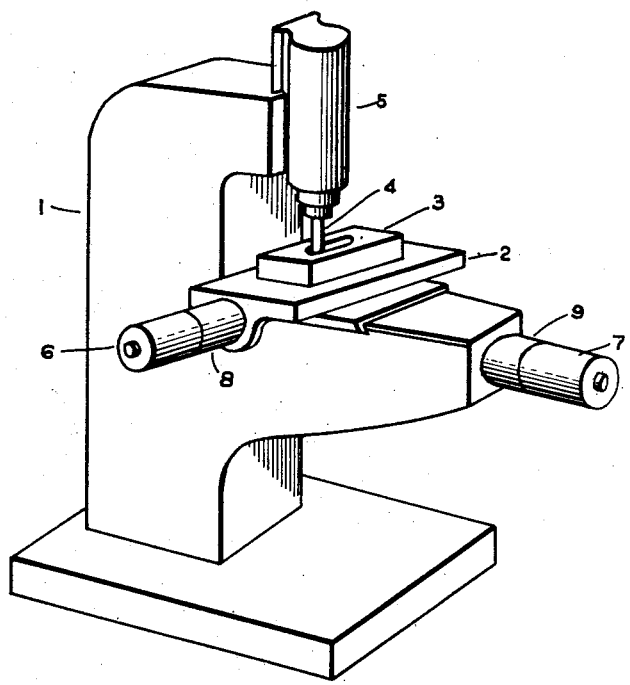
Figure 1 is a perspective view of a vertical miller showing mountings of the control motors.

In Figure 1, selsyn motors 6 and 7 are mounted on the vertical miller to control both longitudinal and transverse movement of the table 2 with respect to the cutter 4. The workpiece 3 on which the desired contour is to be cut is rigidly mounted upon the table 2. The motor 6 controls the longitudinal movement of the table through gear reducer 8. Selsyn motor 7 controls the transverse movement of the table through gear reducer 9. The cutting tool 4 is mounted in the spindlehead 5 and is rotated by a motor, not shown, mounted within the frame 1 of the machine tool.

Figure 2:
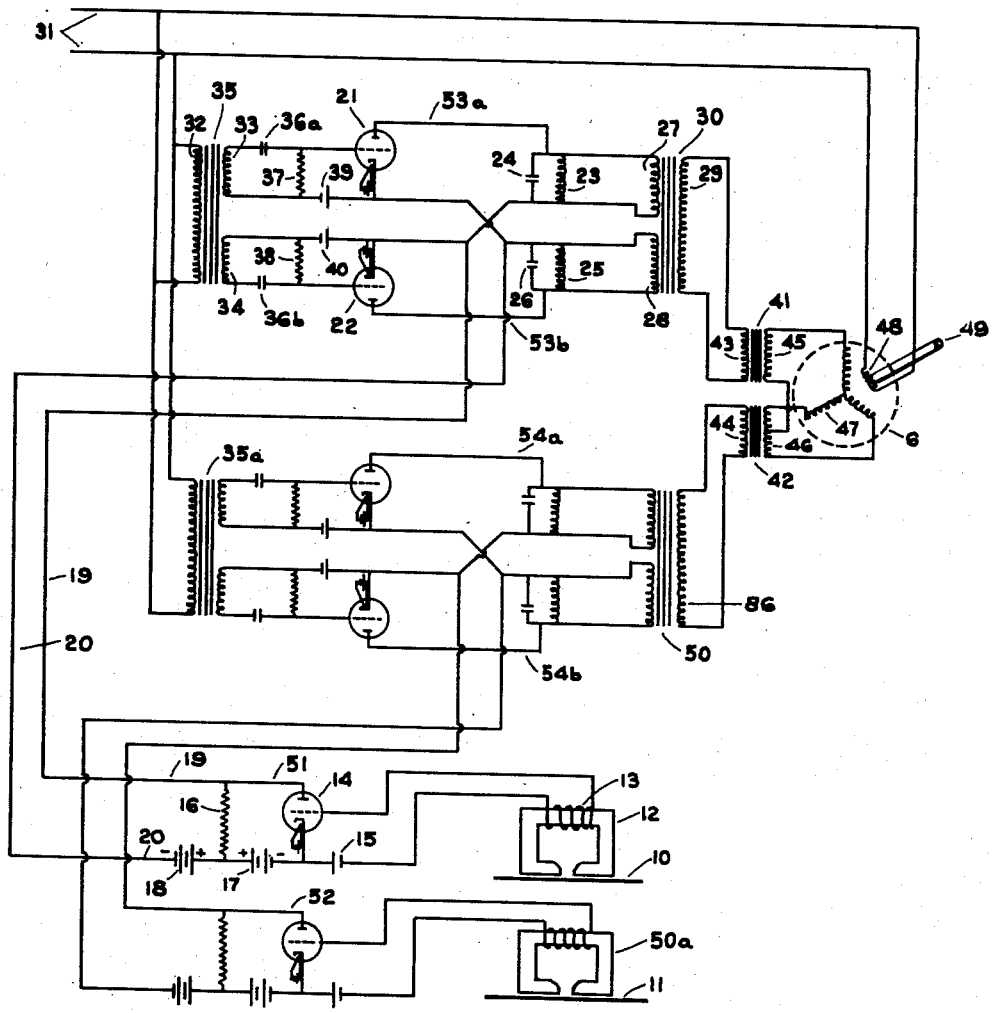
Figure 2 is a wiring diagram of the electrical circuit for controlling one motor.

In order to operate the control motor 6, two magnetic tapes or wires 10 and 11, as shown edgewise in Figure 2, are used. The tapes may be magnetized in any suitable manner to hold magnetic signals. The signal in the tape 10 is picked up by coil 13 of the magnetic head 12. The signal in the coil 13 is impressed upon the grid of the tube 14 in the amplifier 51. The tube 14 may be of the triode type with a sharp plate current cut-off point. D. C. supply 15 in the grid circuit biases the tube to the cut-off point. D. C. supply 17 furnishes the plate voltage through load resistance 16. The plate current is nearly proportional to the signal induced in the coil 13. Thus, the voltage across the load resistance 16 is proportional to this signal. D. C. supply 18 is inserted as shown, with the indicated polarity, in order that the voltage across conductors 19 and 20 may have either positive or negative polarity with respect to each other. The magnitude of this supply voltage 18 is equal to one-half the maximum voltage drop in the resistance 16. When the tube 14 is not conducting, the potential of conductor 19 is greater than that of conductor 20 by the supply voltage 18. When a maximum signal is impressed upon the grid, the potential in the conductor 20 is greater than that in the conductor 19 by an amount equal to the voltage 18. As the signal impressed upon the grid varies from zero to the maximum, the potential in the conductor 19 varies accordingly from a positive maximum value to a negative maximum value.

The potential across the conductors 19 and 20 is then sent into two Class C amplifiers 53a and 53b as indicated. Through transformer 35, sinusoidal voltage variations from A. C. supply lines 31 are impressed upon the grids of the tubes 21 and 22. The voltages impressed upon the separate secondaries 33 and 34 of the transformer 35 provide the grid voltages across the grid resistors 37 and 38 through the blocking condensers 36a and 36b.

D. C. supply voltages 39 and 40 bias the respective tubes 21 and 22 beyond the cut-off point. Each of the tubes has its plate connected to a separate tuned circuit as shown. Tube 21 is connected to the tuned circuit composed of capacitance 24 and inductance 23. Tube 22 is connected to the tuned circuit composed of capacitance 26 and inductance 25. Each of these tuned circuits is tuned to the frequency of the supply voltage 31. The plate supply for each of the amplifiers 53a and 53b is furnished by the amplifier 51 through the conductors 19 and 20. In a Class C amplifier, the voltage across the tuned circuit is proportional to the plate supply voltage. Thus, when the voltage in the conductor 19 is greater than that in conductor 20, the voltage impressed upon the plate of the tube 21 is positive, resulting in a flow of current through the tank circuit 24 and 23. The voltage across the tank circuit is proportional to the output of the amplifier 51 and in turn proportional to the signal impressed upon the magnetic tape 10. The voltage across the tank circuit is connected to the primary 27 of the output transformer 30. When the potential in the conductor 19 is less than that of conductor 20, plate current ceases to flow through the tube 21 and starts to flow in the tube 22 through which no current had been flowing when tube 21 was conducting. The output voltage of the tank circuit 25 and 26 is proportional to the output of the amplifier 51, and in turn is proportional to the signal on the magnetic tape 10. The output of the tuned circuit is connected to the primary 28 of the transformer 30. The voltage induced in the secondary 29 of transformer 30 will have a frequency equal to that of the supply voltage 31. The amplitude of the frequency is determined by the amplitude of the signal of the tape 10. Thus, the envelope of the voltage induced in the secondary will have the same shape as the wave of the signal of the tape 10.

Likewise, the signal in the magnetic tape 11 which has a cosine relation to the signal in the tape 10 is picked up by the magnetic head 50a and amplified through the amplifier 52 which is similar to amplifier 51. The output from amplifier 52 is inserted into the plate circuits of the Class C amplifiers 54a and 54b which are connected similarly to amplifiers 53a and 53b. The outputs from the Class C amplifiers 54a and 54b are similarly inserted in the primaries of transformer 50. Thus, the voltage induced in the secondary 86 of transformer 50 has a frequency equal to that of the supply voltage 31, associated through transformer 35a, and an envelope cosinusoidally related to the envelope of the voltage in the secondary 29. The transformers 41 and 42 combine these voltages in a manner to produce the voltage relations across each of the three motor windings as described above. One terminal of the secondary 45 is connected to the secondary of the motor 6. The other terminal is connected to the mid-tap of the secondary 46. The motor secondary 47 is shown as Y connected, but other connections may be used. The terminals of the secondary 46 are connected across the other two windings of the secondary 47 of the motor 6. The primary of the motor 6 is supplied by the source 31. The frequency of the envelope of the varying amplitude line frequency voltages across the secondaries 29 and 86 determines the speed of the rotor shaft 49 of the motor 6. For each sinusoidal cycle of the envelopes, the shaft 49 will rotate one electrical revolution. In a two pole motor, one electrical revolution is equal to one mechanical revolution. Hence, it is seen that the signals impressed upon the magnetic tapes 10 and 11 control the angular rotative position of the motor shaft 49. The greater the frequency of the envelope signal in a unit length of magnetic tape, the greater will be the speed of rotation of the shaft 49 for a given tape speed. The speed of rotation of the shaft 49 may also be controlled by the rate at which the magnetic tapes pass through the magnetic heads. These magnetic heads may comprise a split magnetic path and coil as illustrated.

Figure 3:
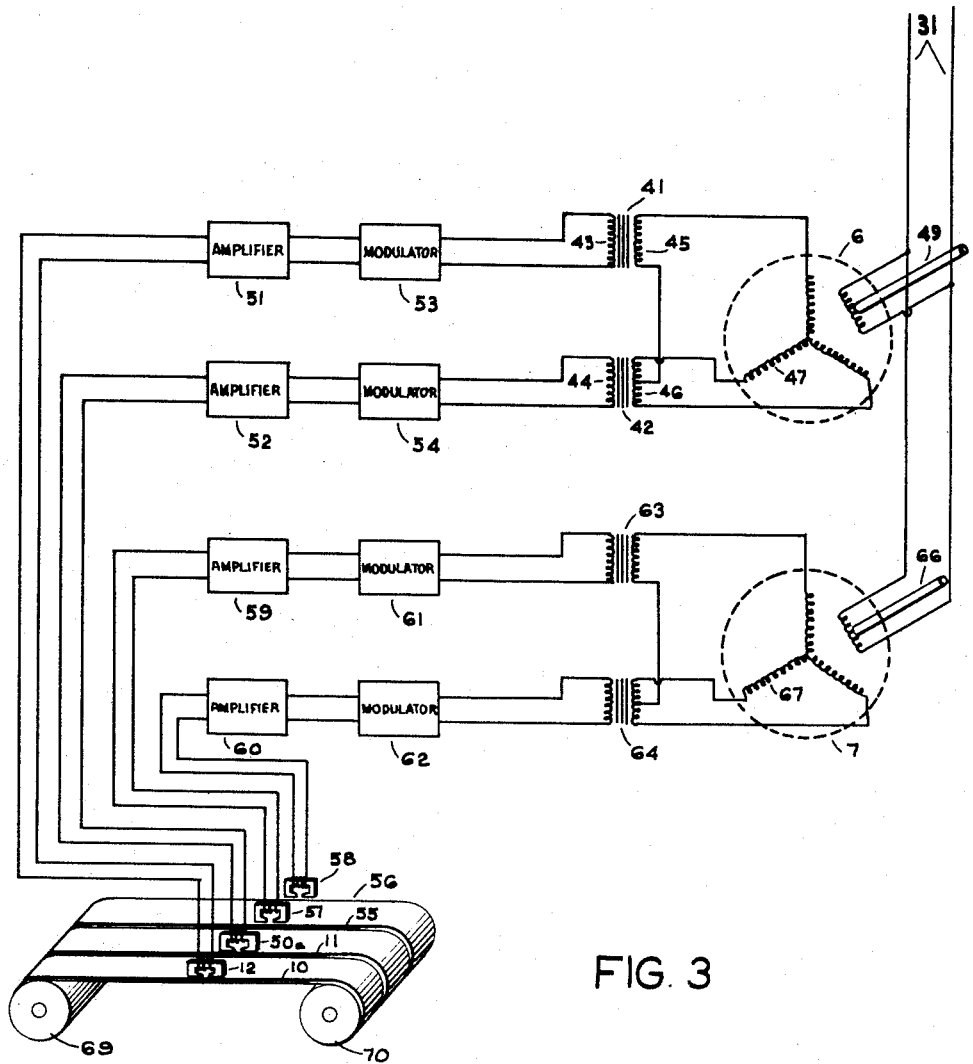
Figure 3 is a diagrammatic representation of an electrical circuit, partly in block form, for controlling two motors by means of a magnetic tape and associated mechanism.

In order to follow a predetermined contour, it is necessary to control the relative movements of the two motors 6 and 7 mounted on the machine tool of Figure 1. As shown in Figure 3, the magnetic tapes 10 and 11 control the movement of the shaft 49 of the motor 6. The tapes 55 and 56 control the movement of the shaft 66 of motor 7. The signals in the tapes 10 and 11 are picked up by the magnetic heads 12 and 50a and are amplified by the amplifiers 51 and 52. The amplified signals are supplied to modulators 53 and 54 where an alternating carrier current is modulated accordingly. The outputs from the modulators are applied to the transformers 41 and 42 which combine the voltages before impressing them upon the secondary 47 of the motor 6. The signals in the tapes 55 and 56 are picked up by magnetic heads 57 and 58 and passed through the amplifiers 59 and 60, through modulators 61 and 62, and through transformers 63 and 64 to the secondary 67 of the motor 7. The relative frequencies of the signals in the tapes 10 and 11, and in the tapes 55 and 56, control the ratio at which the shafts 49 and 66 rotate. The magnetic tapes are wound on a reel advancer 69 and, during operation, the tapes are unreeled and are wound on reel advancer 70. The four tapes must move in synchronism at all times. A slipping action between the two tapes associated with one motor would cause them to lose their trigonometric relation in the signal and thus the movement of the motor would not be correct. A slipping action between the two tapes associated with one motor and the two tapes associated with another motor would result in an improper contour inasmuch as the ratio of the speeds of the motors would not be of proper value. The mechanism for reeling and unreeling the tapes is not shown but may be of conventional type. In order to increase the speed of cutting, the rate at which the tapes are moved past the magnetic heads is increased. The tapes may be formed by magnetizing in any suitable manner.

Instead of four separate magnetic tapes or wires, one tape or wire with four separate channels may be used.

Figure 4:
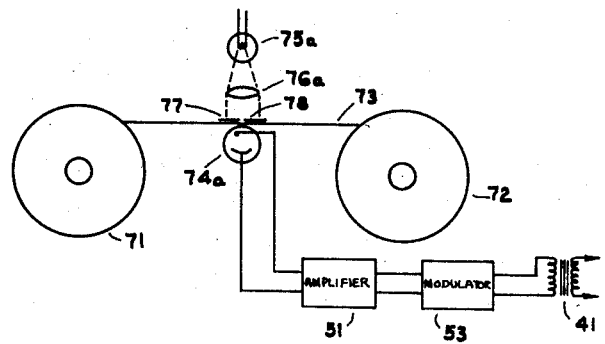
Figure 4 is a diagrammatic side view of a portion of a control circuit including photoelectric means and an associated shaded transparent tape for providing control signals.

Instead of a magnetic pickup, a photoelectric pickup may be used for the control of the speed or position of the motors. There is shown in Figure 4 the lens 76a which forms a parallel beam from the light of the source 75a. The opaque mask 77 permits a narow beam of light to pass through the slit 78 which is a few thousandths of an inch wide. This light passes through the transparent tape 73 to energize the photoelectric cell 74a. The signal energizing the photoelectric cell 74a is amplified in amplifier 51 and then passes to the modulator 53 and to the transformer 41 from which it is combined with a voltage determined by another similarly connected photoelectric cell in order to control a motor. The unwinding and winding of the tape 73 from the reels or advancers 71 and 72 is done in a manner similar to that used in movie film work. The tape 73 may be translucent or transparent or light reflecting. In the latter case, the photocell is located on the same side of the tape as the light source. These tapes, whether photoelectric or magnetic, constitute an intelligence record. They are carried by record advancers or reels, as shown in Figs. 3 and 4. Means (not shown) are employed to drive the record advancers at a predetermined speed which governs the rate of workpiece generation.

Figure 5:
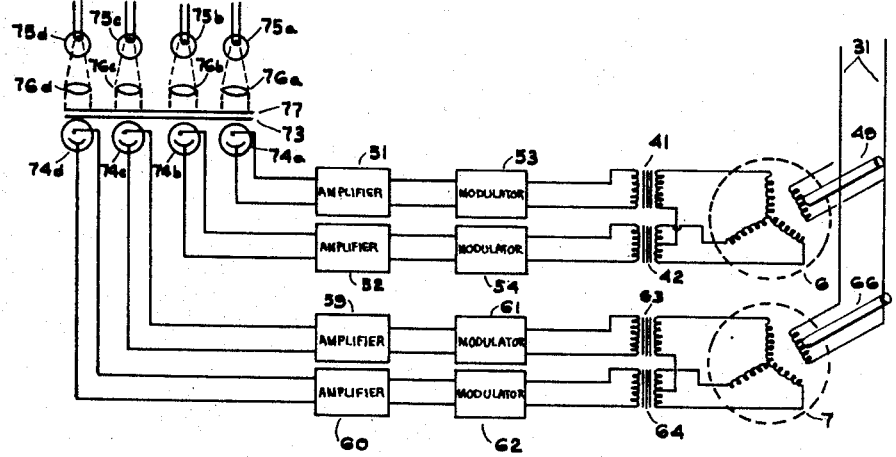
Figure 5 is a diagrammatic representation of an electrical circuit, partly in block form, including photoelectric means for controlling two motors.
Figures 6, 7:
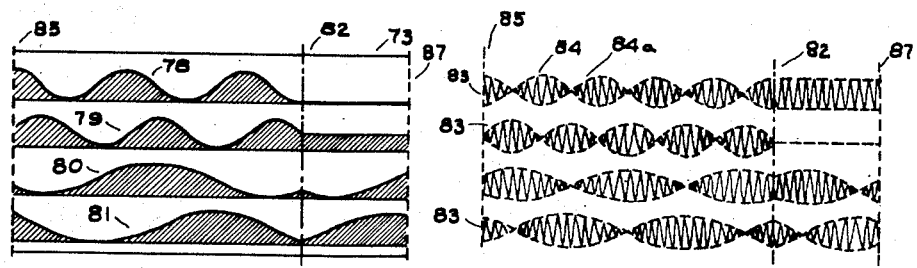
Figure 6 is a fragmentary plan view of the shaded transparent tape used in the device of Figure 5.
Figure 7 is a diagrammatic representation of several cycles of modulated voltages produced by the fragment of tape shown in Figure 6, and associated mechanism.

In order to control the rotation of two motors, the tape 73 contains four signals as shown in Figure 6. Shaded curves 80 and 81 control one motor and the shaded curves 78 and 79 control another motor. The amplitude of the curve determines the magnitude of the signal produced in its respective photoelectric cell. As shown in Figure 5, there are four photocells, 74a, 74b, 74c, and 74d. Each of these cells is aligned with a shaded curve on the tape. The lenses 76a, 76b, 76c and 76d form a parallel beam for each of the light sources 75a, 75b, 75c, and 75d. The narrow slit 78 in the mask 77 runs across the entire width of the tape. As was done with the magnetic pickup, the signals from the photoelectric cells are sent into amplifiers, then to modulators and transformers which combine the outputs to control the positions of the motors. The connections are as indicated, the components being numbered similarly to those previously designated. Instead of four light sources and four lenses, one light source and one lens may be substituted.

In the fragment of tape 73 of Figure 6, the sine waves 78 and 79 have the same frequency from the time axis 85 to the time axis 82. It is seen however, that sine wave 79 leads the sine wave 78 by 90 degrees with respect to time. For each cycle of the sine wave, the shaft of the motor makes one electrical revolution. After the point 82, the waves 78 and 79 each maintains the same amplitude. Thus, the motor position remains constant from this point to the end 87 of the tape shown. The waves 80 and 81 control the position of the other motor. Again, one wave leads the other by 90 degrees with respect to time. The frequency of the waves 80 and 81 is one half of that of the frequency of the waves 78 and 79. Thus, the motor associated with the waves 80 and 81 rotates at half the speed of the motor associated with the waves 78 and 79 during that period represented between the time axes 85 and 82. At the time represented by the axis 82, the motor associated with the curves 80 and 81 reverses its direction of rotation. It is seen that the curve during this period is the image of the curve during the period preceding it.

The voltages impressed upon the transformers leading to the control motors due to the fragment of the tape in Figure 6 are shown in Figure 7. The carrier wave 83 has the same frequency and phase for all four of the voltages. These amplitude modulated voltages are enclosed by envelopes which have the same shape as the corresponding curves shown in the fragment of tape in Figure 6. The envelope 84 has exactly the same shape as the curve 78. The curve 84a represents the other half of the envelope for the voltage due to the curve 78. Each time these envelopes intersect each other, the polarity impressed upon the transformer is changed. The foregoing analysis applies to the enveloped voltages due to the curves 79, 80 and 81, also.

The description that has been presented is one embodiment of this invention. If depth milling is desired, a third motor could be mounted on the spindle carriage to control the vertical position of the tool. This third motor would have its related signal tapes, wires, or equivalent elements and associated circuit. The invention may also be applied to any machine where it is desired to control the position or speed of one or more motors, such as in the paper making, textile, or chemical processing or fabricating industries.

It should be noted that while single phase self-synchronous motors are employed to provide motion for the generating machine tool, the control system is capable of being employed when polyphase self-synchronous motors are substituted. Polyphase self-synchronous motors, as utilized in my copending application Serial No. 591,903, operate from a polyphase power source and have a different theory of operation from that of the single phase self-synchronous type motors. The resulting mechanical output of the motors, however, is identical. The substitution of polyphase self-synchronous motors constitutes another embodiment of this invention and in no way alters the operation of the machine tool or its control system. It is necessary, however, that a portion of the control be duplicated, in order that the requirements of the polyphase self-synchronous type motors may be accommodated.

As mentioned, a polyphase power source must be available and polyphase control must be afforded. In Fig. 2, for example, a polyphase self-synchronous motor would be substituted for the single phase self-synchronous motor 6 shown. A second winding on the rotor, similar to winding 48, is connected to the second phase of a two phase power source. The second phase would, for example, be quadrature phase related with the alternating current supply source shown as 31. The rotor connections with the two phase power source thus afforded provide a rotating field in the rotor of the polyphase self-synchronous motor. According to theory for polyphase self-synchronous motors, it is necessary that the stator of the motor, similar to that indicated as 47 in Fig. 2, must also have a rotating field which, when synchronized with the rotating field of the rotor with common direction of rotation, affords locked-in poles between rotor and stator with zero mechanical rotation from the motor shaft.

A duplication of the modulator circuits in Fig. 2 shown respectively between the transformers 35 and 30 and between the transformers 35a and 50 is furnished, with the primaries of the transformers corresponding to 35 and 35a receiving excitation from the second phase of the two phase power supply, and with the outputs of the transformers corresponding to 30 and 50 connected in series with the outputs of the transformers 50 and 30 respectively, to provide the necessary rotating field on the rotor when fed to and transformed by the transformers 41 and 42. In this case the transformers 41 and 42 constitute a Scott connection for supplying three phase to the stator of the polyphase self-synchronous motor. The extra duplicate modulator circuits in the order mentioned receive their input signals by parallel connection with the amplifier outputs of the pickups 12 and 50a, respectively.

I do not intend to be restricted by the form of the circuit shown as it is apparent to one versed in the art that the circuit may assume many different forms. In order to pick up the signal from the records, any of the methods of sound reproduction using electronic means may be used as well as the magnetic and photoelectric methods described. Broadly, control of the position of the motor from a record may be accomplished by placing two related signals on the record and amplifying them, then using the signals to amplitude modulate an alternating current and the output so combined as to control a motor.

In the specification and claims, the words tape, wire, or the like, are used synonymously.

What I claim is:

1. An open loop control system for a selsyn receiver motor including rotor and stator windings, a fixed frequency alternating current supply source for one of said motor windings, a control circuit connected with the other of said motor windings, said control circuit including an intelligence pick-up means, an intelligence signal amplifier means, and modulator means including power amplifier means comprising a pair of transformers having their primary windings supplied with current from said fixed frequency alternating current supply source and their secondary windings impressing a voltage upon said modulator means, another portion of said modulator means having impressed thereon the varying voltages of said amplified intelligence signal to impress A. C. voltages of varied amplitudes on a portion of the other of said motor windings through the operation of said modulator means, and a movably mounted intelligence record disposed in close proximity with said intelligence pick-up means and cooperating therewith to induce voltages in said control circuit, said intelligence record including quadrature related indicia active upon movement of said intelligence record to control the direction and speed of rotation of said selsyn receiver motor.

2. An open loop control system for a selsyn receiver motor, as set forth in claim 1, in which the intelligence record comprises a magnetized tape bearing related sine-cosine wave indicia effective upon movement of said intelligence record to determine and control the speed and direction of rotation of said motor.

3. An open loop control system for a selsyn receiver motor, as set forth in claim 1, in which the intelligence pick-up means comprises photoelectric means.

4. An open loop control system for a selsyn receiver motor, as set forth in claim 1, in which the intelligence record comprises a magnetized tape bearing quadrature related indicia and in which said intelligence pick-up means comprises a magnetic head.

5. An open loop control system for a plurality of selsyn receiver motors each including rotor and stator windings, a predetermined frequency alternating current supply source for one of each of said motor windings, control circuits connected with the other of each of said motor windings, said control circuits including an intelligence pick-up means, intelligence signal amplifier means, and modulator means, said modulator means being supplied in part from said fixed frequency alternating current supply source and in part from said amplified intelligence signals to vary the amplitudes of A. C. voltages impressed upon each of said last named motor windings through the operation of said modulator means, and a movably mounted intelligence record disposed in close proximity with said intelligence pick-up means and cooperating therewith to induce voltages in said control circuits, said intelligence record including a pair of quadrature related indicia for each of said motors to control the direction and speed of rotation of said selsyn receiver motors individually in accordance with the frequency of the quadrature related indicia delineated for each motor on said intelligence record.

6. An open loop control system for a selsyn receiver motor including rotor and stator windings, a predetermined frequency alternating current supply source for one of said motor windings, a control circuit connected to the other of said motor windings, said control circuit including an intelligence pick-up means, an intelligence signal amplifier means, and modulator means including a pair of electronic tubes, each having a cathode, grid, and a plate, the grid of each of said tubes being electrically responsive to said predetermined frequency alternating current supply source, a pair of tuned circuits tuned to said predetermined frequency, one of said tuned circuits being electrically connected to the plate of one of said tubes and the other of said tuned circuits being electrically connected to the plate of said other tube, the cathode of one of said tubes being electrically connected to the plate circuit of said other tube and the cathode of said other tube being electrically connected to the plate circuit of said first mentioned tube, and an output circuit for said modulating means connected to the other of said motor windings, and a movably mounted intelligence record disposed in close proximity with said intelligence pick-up means and cooperating therewith to induce a voltage in said control circuit for varying the speed of said selsyn motor in accordance with the demands imposed upon said control circuit through the medium of said intelligence record.

7. An open loop control system for a selsyn receiver motor including rotor and stator windings, a predetermined frequency alternating current supply source for one of said motor windings, a control circuit connected to the other of said motor windings, said control circuit including intelligence pick-up means, an intelligence signal amplifier means, and modulator means, said modulator means including electrical connections with said predetermined frequency current supply source and electrical connections with said intelligence signal amplifier means to control said modulator, and a movably mounted intelligence record disposed in close proximity with said intelligence pick-up means and cooperating therewith to induce a voltage in said control circuit, said intelligence record including a pair of quadrature related indicia active upon movement of said intelligence record to vary the output of said modulator and thereby control the direction and speed of rotation of said selsyn receiver motor in accordance with the dictates of said intelligence record.

8. An open loop control system for a selsyn receiver motor including rotor and stator windings, a predetermined frequency alternating current supply source for one of said motor windings, a control circuit connected to the other of said motor windings, said control circuit including a pair of identical branches each comprising an intelligence pick-up means, an intelligence signal amplifier means, and a modulator means, each of said modulator means including electrical connections with said predetermined frequency current supply source and electrical connections with the respective intelligence signal amplifier means, and a movably mounted intelligence record disposed in close proximity with both of said intelligence pick-up means and cooperating therewith to induce separate voltages in the respective branches of said control circuit, said intelligence record including sine-cosine related indicia each respectively operative upon one of said intelligence pick-up means to vary the output of said respective modulator means to thereby control the direction and speed of rotation of said selsyn receiver motor in accordance with the dictates of said intelligence record.

9. An open loop control system for a selsyn receiver motor including rotor and stator windings, a predetermined frequency alternating current supply source for one of said motor windings, a control circuit connected to the other of said motor windings, said control circuit including a pair of identical branches each comprising an intelligence pick-up means, an intelligence signal amplifier means, and a modulator means, each of said modulator means including electrical connections with said predetermined frequency current supply source and electrical connections with the respective intelligence signal amplifier means, and a movably mounted intelligence record disposed in close proximity with both of said intelligence pick-up means and cooperating therewith to induce a voltage in the respective branches of said control circuit, said intelligence record including pre-established sinusoidal and cosinusoidal electrical variations of a frequency other than that of the alternating current supply source for one of said motor windings, said separate pre-established sinusoidal and cosinusoidal electrical variations being operative upon one or the other of said intelligence pick-up means to vary the output of its respective modulator means and thereby control the direction and speed of rotation of said selsyn receiver motor in accordance with the dictates of said intelligence record.

10. An open loop control system for a reversible selsyn motor including rotor and stator windings, said motor being operative to alter the position between relatively movable tool and workpiece retaining elements of a machine tool to effect the machining of irregularly shaped surfaces on a workpiece, said control system comprising a control circuit including intelligence pick-up means, an intelligence amplifier means, and modulator means, a fixed frequency alternating current supply source for one of said motor windings, said modulator means being supplied in part from said fixed frequency alternating current supply source and in part from said amplified intelligence signals to vary the A. C. voltages impressed upon said other motor winding through the operation of said modulator means, and a movably mounted intelligence record disposed in close proximity with said intelligence pick-up means and cooperating therewith to induce voltages in said control circuit, said intelligence record including quadrature related indicia active upon movement of said intelligence record to control the direction and speed of rotation of said selsyn motor in accordance with the dictates of said intelligence record.

11. An open loop control system for a reversible selsyn motor including rotor and stator windings, said motor being operative to alter the position between the relatively movable tool and workpiece retaining elements to effect the machining of shaped surfaces on the workpiece, said control system comprising a control circuit including intelligence pick-up means, an intelligence amplifier means, and modulator means, a fixed frequency alternating current supply source for one of said motor windings, said control circuit being connected to the other of said motor windings, said modulator means being supplied in part from said fixed frequency alternating current supply and in part from said amplified intelligence signals to vary the A. C. voltages impressed upon said last named motor winding, and a movably mounted intelligence record disposed in close proximity with said intelligence pick-up means and cooperating therewith to induce voltages in said control circuit, said intelligence record including quadrature related indicia active upon movement of said intelligence record to control the direction and speed of rotation of said selsyn motor in accordance with the dictates of said intelligence record.

12. An open loop control system for a plurality of reversible selsyn motors each including rotor and stator windings, said motors being operative to control and alter a pair of relatively movable workpiece supporting elements with respect to a tool carrying element to effect the machining of shaped surfaces on the workpiece, a predetermined frequency alternating current supply source for one of each of said motor windings, control circuits connected with the other of each of said motor windings, said control circuits each including an intelligence pick-up means, intelligence amplifier means, and modulator means, said modulator being supplied in part from said fixed frequency alternating current supply source and in part from said amplified intelligence signals to vary the amplitudes of A. C. impressed upon said last named motor windings through the operation of said modulator means, and a movably mounted intelligence record disposed in close proximity with each of said intelligence pick-up means and cooperating therewith to induce voltages in said control circuits, said intelligence records each including a pair of magnetic signal sending means to regulate the output of said modulator means to control the direction and speed of rotation of said selsyn receiver motors individually in accordance with the dictates of said magnetic signal sending means imposed upon each of said intelligence records.

13. An open loop control system for a plurality of reversible selsyn motors each including rotor and stator windings, said motors being operative to control and alter a pair of relatively movable workpiece supporting elements with respect to a tool carrying element to effect machining of shaped surfaces on the workpiece, a predetermined frequency alternating current supply source for one of each of said motor windings, control circuits connected with the other of each of said motor windings, said control circuits each including an electronic intelligence pick-up means, intelligence amplifier means, and modulator means, said modulator being supplied in part from said fixed frequency alternating current supply source and in part from said amplified intelligence signals to vary the amplitudes of A. C. impressed upon said last named motor windings through the operation of said modulator means, and a movably mounted intelligence record disposed in close proximity with each of said electronic intelligence pick-up means and cooperating therewith to induce voltages in said control circuits, said intelligence record including a pair of quadrature related indicia forming a signal sending means for each of said electronic intelligence pick-up means, said respective pairs of quadrature related indicia active upon movement of said intelligence record to control the direction and speed of rotation of said selsyn motors individually in accordance with the dictates of said intelligence record.

14. An open loop control system for a plurality of reversible selsyn motors each including rotor and stator windings, said motors being operative to control and alter a pair of relatively movable workpiece supporting elements with respect to a tool carrying element to effect the machining of shaped surfaces on the workpiece, a predetermined frequency alternating current supply source for one of each of said motor windings, control circuits connected with the other of each of said motor windings, said control circuits each including an intelligence pick-up means, intelligence amplifier means, and modulator means including power amplifier means comprising a pair of transformers having their primary windings supplied with current from said predetermined frequency alternating current supply source and their secondary windings impressing a voltage upon each of said modulator means, another portion of said modulator means having impressed thereon the varying voltages of said amplified intelligence signals to impress A. C. voltages of varied amplitudes on a portion of each of said motor windings connected to said control circuits, and a movably mounted intelligence record disposed in close proximity with both of said intelligence pick-up means and cooperating therewith to induce voltages in said control circuits, said intelligence record including a pair of quadrature related indicia for each of said motors to control the direction and speed of rotation of said motors in accordance with the frequency of the quadrature related indicia delineated for each motor on said intelligence record.

15. An open loop control system for a plurality of reversible selsyn motors each including rotor and stator windings, said motors being operative to control and alter the position of a pair of relatively movable elements upon which a workpiece is supported with respect to a tool carrying element to effect the machining of shaped surfaces on the workpiece, a predetermined frequency alternating current supply source for one of each of said motor windings, control circuits connected with the other of each of said motor windings, said control circuits each including an intelligence pick-up means, intelligence amplifier means, and modulator means supplied in part from said fixed frequency alternating current source and in part from said amplified intelligence signals to vary the A. C. voltages impressed upon said last named motor winding, and a movably mounted intelligence record disposed in close proximity with said intelligence pick-up means and cooperating therewith to induce voltages in said control circuit, said intelligence record including signal sending means operative upon movement of said intelligence record to control the direction and speed of rotation of said selsyn motors individually in accordance with the dictates of said signal sending means.

16. An open loop control system for a plurality of reversible selsyn motors, as set forth in claim 15, in which the signal sending means on said intelligence record comprise a plurality of sinusoidal intelligence signals.

17. An open loop control system for a plurality of reversible selsyn motors, as set forth in claim 15, in which the signal sending means on said intelligence record comprise pairs of sine-cosine related intelligence signals.

18. An open loop control system for a plurality of reversible selsyn motors, as set forth in claim 15, in which the signal sending means on said intelligence record comprise a pair of sine-cosine related constant amplitude intelligence signals.

19. An open loop control system for a plurality of reversible selsyn motors, as set forth in claim 15, in which the signal sending means on said intelligence record comprise a plurality of sinusoidal constant amplitude intelligence signals.

JOSEPH J. GANO.

References Cited in the file of this patent

UNITED STATES PATENTS

| Number | Name | Date |
|---|---|---|
| 684,579 | Michalke | Oct. 15, 1901 |
| 684,612 | Michalke | Oct. 15, 1901 |
| 1,234,170 | Johnson | July 24, 1917 |
| 1,410,890 | Carson | Mar. 28, 1922 |
| 1,463,795 | Carson | Aug. 7, 1923 |
| 1,474,944 | Re Qua | Nov. 20, 1923 |
| 1,564,788 | Hildebrande | Dec. 8, 1925 |
| 1,576,195 | Junken | Mar. 9, 1926 |
| 1,654,902 | Smythe | Jan. 3, 1928 |
| 1,896,742 | Culver | Feb. 7, 1933 |
| 1,926,886 | Schelleng | Sept. 12, 1933 |
| 1,929,060 | Fitzgerald | Oct. 3, 1933 |
| 1,970,442 | Wittkuhns | Oct. 14, 1934 |
| 1,984,156 | Purington | Dec. 11, 1934 |
| 2,041,855 | Ohl | May 26, 1936 |
| 2,092,142 | Schuz | Sept. 7, 1937 |
| 2,096,323 | Gille | Oct. 19, 1937 |
| 2,151,127 | Logan et al. | Mar. 21, 1939 |
| 2,213,108 | Pollard | Aug. 27, 1940 |
| 2,302,002 | Bryce | Nov. 17, 1942 |
| 2,313,136 | Fischer | Mar. 9, 1943 |
| 2,323,966 | Artzt | July 13, 1943 |
| 2,361,846 | Garman | Oct. 31, 1944 |
| 2,366,577 | Thompson | Jan. 2, 1945 |
| 2,370,000 | Best | Feb. 20, 1945 |
| 2,397,933 | Fowle et al. | Apr. 9, 1946 |
| 2,402,928 | Summers | June 25, 1946 |
| 2,446,607 | Peterson | Aug. 10, 1948 |
| 2,459,253 | Tyrner | Jan. 18, 1949 |